United States Patent [19]

Gibbs

[11] Patent Number: 5,214,855
[45] Date of Patent: Jun. 1, 1993

[54] INSTRUMENT FLIGHT NAVIGATIONAL APPARATUS AND METHOD

[76] Inventor: Charles W. Gibbs, P.O. Box 1806, Buena Vista, Colo. 81211

[21] Appl. No.: 805,573

[22] Filed: Dec. 10, 1991

[51] Int. Cl.$^5$ .................................... G01C 21/20
[52] U.S. Cl. .................................... 33/1 SD; 33/431; 235/78 N
[58] Field of Search .................. 33/431, 15 D, 15 B; 235/61 B, 61 NV, 78 N

[56] References Cited

U.S. PATENT DOCUMENTS

| | | | |
|---|---|---|---|
| 2,007,986 | 7/1935 | Sprague | 33/431 |
| 2,268,886 | 1/1942 | McNamara | 33/15 D |
| 2,294,276 | 8/1942 | Callinicos | 35/40 |
| 2,775,404 | 12/1956 | Lahr | 33/15 D |
| 2,996,242 | 8/1961 | Bannister | 33/15 D |
| 3,063,626 | 11/1962 | Krister | 33/431 |
| 3,110,965 | 11/1963 | Kittock | 33/15 D |
| 3,215,453 | 11/1965 | Malcom, Jr. | 281/44 |
| 3,497,678 | 2/1970 | Warner | 33/431 |
| 3,855,706 | 12/1974 | Price | 33/431 |
| 4,103,809 | 8/1978 | Frost et al. | 224/5 R |
| 4,243,249 | 1/1981 | Goss | 281/1 |
| 4,274,204 | 6/1981 | Self | 33/15 D |
| 4,359,628 | 11/1982 | Lambert | 33/431 |

FOREIGN PATENT DOCUMENTS

| | | | |
|---|---|---|---|
| 885816 | 9/1943 | France | 33/431 |
| 2067755 | 7/1981 | United Kingdom | 33/15 D |

OTHER PUBLICATIONS

Sporty's Pilot Shop Catalog: Instrument Plotter and Holding Entry Visualizer; PDQ Computer; Greenwood VOR & ADF Computer; Jeppesen PV-5 IFR Plotter; Jeppesen Holding Pattern Computer No Date.

*Primary Examiner*—Thomas B. Will
*Attorney, Agent, or Firm*—John R. Flanagan

[57] ABSTRACT

An instrument flight navigational apparatus includes a flat board having a center hole and indicia displayed on a front face relative to the center hole, a circular holding pattern template of transparent material and having a center hole and indicia displayed on a front face relative to the center hole, a compass protractor of transparent material having a center hole and indicia displayed on a front face relative to the center hole, and a flat elongated needle of transparent material having a center hole and a pointer displayed on a front face relative to the center hole. The apparatus also includes a plurality of annular spacers disposed between the board, template, protractor and needle for spacing the template from the board, the protractor from the template and the needle from the protractor so as to allow rotation of the template, protractor and needle independent of one another and relative to one another and to the board. The apparatus further includes a releasable fastener for extending through the center holes of the board, template, protractor and needle for aligning and overlaying the board, template, protractor and needle and releasably clamping them at any desired rotational angular position relative to one another. The first, second and third indicia and the pointer displayed on the respective board, template, protractor and needle are data and symbols adapted for use in solving navigational problems encountered in an instrument flight environment.

22 Claims, 3 Drawing Sheets

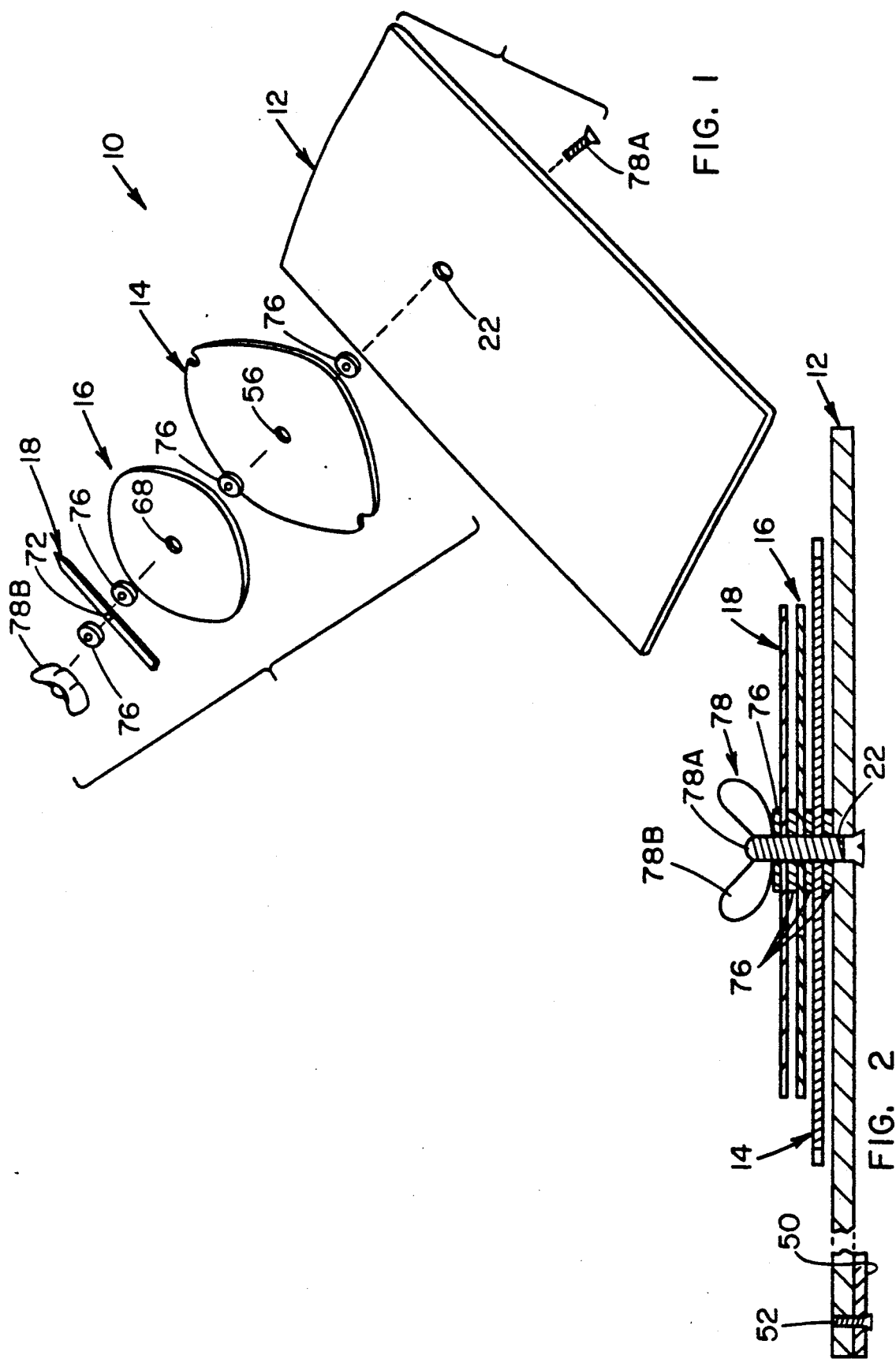

INSTRUMENT FLIGHT NAVIGATIONAL APPARATUS AND METHOD

BACKGROUND OF THE INVENTION

1. Field of the Invention

The present invention generally relates to the field of instrument flying and, more particularly, is concerned with an instrument flight navigational apparatus and method.

2. Definitions of Instrument Flight Terms

The terms listed below are some of the jargon of instrument flying pertinent to understanding the present invention. Their definitions have been composed from definitions and explanations provided by several texts on instrument flying, namely, "Instrument Flying, 2nd Edition" by Richard L. Taylor (Macmillan Publishing Co., Inc., 1978) and "The Art of Instrument Flying, 2nd Edition" by J. R. Williams (TAB Books, 1991), and on flying in general, namely, "The Pilot's Handbook of Aeronautical Knowledge, Revised and Expanded Edition" by Paul E. Illman (TAB Books, 1991).

The provision of these definitions is, of course, not necessary for one of ordinary skill in the art of instrument flying to understand the present invention. Rather, the definitions of these terms are being set forth for the benefit of those not skilled in this art in order to provide sufficient background to facilitate an adequate understanding of the present invention without the need to consult the cited texts.

The pertinent instrument flying terms and their definitions are as follows:

IFR—This is an acronym for Instrument Flight Rules. However, this term is used universally as a label for all instrument flight operations.

Radio station—This is a ground-based facility at a particular geographical position having either a VOR transmitter or a NDB transmitter which broadcasts a particular signal frequency that can be received by either a VOR receiver or a NDB receiver located on the aircraft when tuned by the pilot to the particular signal frequency.

Course—This is a line drawn on a chart between two points which on IFR charts is assigned a direction referenced as a certain number of degrees clockwise from magnetic north.

Track—This is the path which an aircraft makes across the ground.

Radial—This is a course radiating outwardly FROM a VOR ground station which on IFR charts, as stated above, is assigned a direction referenced as a certain number of degrees clockwise from magnetic north. This is the term used by an air traffic controller (ATC) when referencing navigation instructions relating to a VOR.

Heading—This is the direction in which an aircraft is pointed which in the case of IFR operations is referenced as a certain number of degrees clockwise from magnetic north.

Heading indicator—Also known as a directional gyro, this is an instrument on the aircraft which provides the pilot with the heading of the aircraft.

Vector—This is a heading assigned by an air traffic controller (ATC) for an aircraft to assume.

Bearing—In instrument navigation, this is the direction to or from any point referenced as a certain number of degrees clockwise from magnetic north. In the case of IFR operations, the point is typically a radio station. Where the radio station is a NDB, bearing means the direction toward it. All ADF references are in terms of bearings TO the non-directional beacon (NDB) or other type of radio station; all VOR references are in terms of radials (or bearings) FROM the radio station.

Relative bearing—This is the number of degrees the pointer on an ADF dial is displaced clockwise from the nose of the aircraft. Add relative bearing to heading, and the resulting number is the bearing to the station.

Abeam—This is a position directly off either wingtip of an aircraft, a relative bearing of 90° or 270°.

VOR—This is an acronym for a Very high frequency Omni-directional Radio range. A VOR receiver located on the aircraft is composed of: (1) an Omni Bearing Selector (OBS) which is set on a particular course selected by the pilot; (2) a Course Deviation Indicator (CDI), a left-right needle, which will indicate by its position relative to a center line whether the aircraft is centered on, to the left or, or to the right of, the radial that the OBS setting represents; and (3) a TO-FROM indicator which provides information about whether the course (OBS setting) will take the aircraft TO or FROM the VOR omni transmitter located at the particular ground station. If the aircraft is flying a heading that agrees with the course that is set into the OBS, then the aircraft will proceed toward the VOR transmitting ground station if the TO-FROM indicator shows a TO indication, or away from the VOR transmitting ground station if it shows a FROM indication.

NDB—This is an acronym for a Non-Directional Beacon, a radio station upon which is based instrument procedures using an ADF. The NDB employs a low-frequency radio transmitter located at a ground station. An antenna connected to the radio transmitter broadcasts a signal in all directions. The signal, not being concentrated in any one direction, is termed as non-directional or omni-directional.

ADF—This is an acronym for an Automatic Direction Finder, which is a radio compass that includes a low-frequency radio receiver in the aircraft tuned by the pilot for receiving a particular signal frequency from the NDB at a ground station. (The ADF is also tunable to commercial AM-radio broadcast stations for direction-finding or entertainment purposes.) The ADF radio compass also includes a dial having an indicator pointer or needle which points to the radio station to provide the pilot with a readout of the relative bearing from the aircraft to the station where the NDB sending the signal is located. The relative bearing is measured from the nose of the aircraft which is at "0" on the ADF dial. Thus, when the radio station is straight ahead, the relative bearing is "0"; when the radio station is off the right wing tip or left wing tip, the relative bearing is 90° or 270° respectively; when the radio station is straight behind the aircraft, the relative bearing is 180°.

Holding Pattern—This is an oval-shaped racetrack flight path which begins and ends at some specified holding point or fix designated by the ATC. There are two types of holding patterns, a standard (right turn) holding pattern or a non-standard (left turn) holding pattern. A holding pattern has a non-holding side which is aligned with a first radial on which lies the holding fix and a holding side which is aligned along a second radial spaced to one side of and generally parallel to the non-holding side.

The terminology used to describe the successively connected legs of a standard (or non-standard) holding pattern, beginning at the holding fix and proceeding in the direction of flight about the holding pattern and ending back at the holding fix, is as follows: (1) a semi-circular fix end leg which turns right (or left in a non-standard holding pattern) from the first radial at the location of the holding fix; (2) a linear outbound leg at the holding side of the pattern which connects with the end of the fix end leg at a point abeam the holding fix; (3) a semi-circular outbound end leg which turns right (or left in a non-standard holding pattern) from the end of the outbound leg; and (4) a linear inbound leg at the non-holding side of the pattern which connects with the end of the outbound end leg and extends along the first radial to the holding fix. The speed of the aircraft is restricted to a certain maximum while in the holding pattern. The length of the inbound leg is defined in terms of time with the aircraft traveling at the maximum holding airspeed: below 14,000 feet altitude, the time of the inbound leg should be one minute, while above this altitude the time is one and one-half minutes. The holding pattern is flown several times to adjust the time of the outbound leg, with the timing commenced abeam the fix, in order to establish the proper time of the inbound leg.

Holding pattern entry—There are three different ways to enter a holding pattern: (1) a direct entry; (2) a parallel entry (at the non-holding side); and (3) a teardrop entry. The correct entry to use depends on the angular relationship of the heading of the arriving aircraft to the radial of the holding fix and to a transverse line which intersects the radial through the holding fix at 70° to the inbound leg on the holding side of the pattern and at 110° from the inbound leg on the non-holding side of the pattern. The three entries are defined hereafter with respect to three arcs composing a 360° circle drawn about the holding fix so as to intersect with the transverse line.

The direct entry to the holding pattern is used when the aircraft is approaching the holding pattern from within a first (180°) arc located at the side of the transverse line upstream from the holding fix and extending through 180° from the end of the line at the holding side, across the first radial, to the end of the line at non-holding side of the pattern. The direct entry involves flying the aircraft to the holding fix and then turning outbound right (or left in the case of the non-standard pattern) in a direction the same as the normal flight direction about the holding pattern.

The parallel entry (at the non-holding side) to the holding pattern is used when the aircraft is approaching the holding pattern from within a second (110°) arc located at the side of the transverse line downstream from the holding fix and extending through 110° from the first radial to the end of the line on the holding side of the pattern. The parallel entry involves flying the aircraft directly across the holding fix, then turning the aircraft to fly the first outbound leg along the non-holding side of the holding pattern, then at the outbound end leg turning the aircraft in a direction opposite to the normal flight direction about the holding pattern in order to intercept the normal inbound leg of the pattern and cross the holding fix and thereafter to enter the normal holding pattern direction at the fix end leg thereof.

The teardrop entry to the holding pattern is used when the aircraft is approaching the holding pattern from within a third (70°) arc located at the side of the transverse line downstream from the holding fix and extending through 70° from the first radial to the end of the line on the non-holding side of the pattern. The teardrop entry involves flying the aircraft directly across the holding fix, then turning the aircraft to fly a heading 30° to the outbound leg for one minute on the holding side of the holding pattern, then at the outbound end leg turning the aircraft in a direction the same as the normal flight direction about the holding pattern in order to intercept the normal inbound leg of the pattern and proceed to the holding fix and thereafter to enter the normal holding pattern direction at the fix end leg thereof.

Procedure turn—This is a turn-around of the aircraft in order to head the aircraft back from where it came on a specific course. Three types of procedure turns are: (1) a 60-second procedure turn which requires about three minutes to complete; (2) a 40-second procedure turn; and (3) a 90–270 degree procedure turn which is the fastest one. The paths of these three types of procedure turns have different closed-loop shapes extending from and back to one side of the course.

The 60-second procedure turn starts with a standard rate 45° turn away from the outbound course (heading is given on the navigational chart), followed by flying a timed leg on a new heading for one minute, followed by a standard rate 180° turn away from the timed leg in a direction opposite the first turn, and then flying an untimed leg on another heading for about one-half minute before intercepting the inbound course.

The 40-second procedure turn is used typically to correct for wind drift or to speed up traffic flow. It starts the same as the 60-second turn with a standard rate 45° turn away from the outbound course and timing also starts at the same place. However, the time of flying the timed leg on the new heading depends on the wind correction factor being added or subtracted. The timed flying leg is followed by a standard rate turn usually of more than 180° to intercept the inbound course.

The 90–270 degree procedure turn is used to turn-around in the minimum amount of time and with the minimum amount of outbound displacement. There is no timing involved and the return to the inbound course will be close to where the departure from the outbound course was made. The turn starts with a 90° turn away from the outbound course and ends with a 270° opposite turn back toward the inbound course.

DESCRIPTION OF THE PRIOR ART

Any IFR flight from takeoff to landing is simply a series of connected basic instrument flight procedures. After departure and before arrival, the IFR environment basically involves flying at an assigned altitude from one radio station to the next and maneuvering through holding patterns, procedure turns and intercepting approaches for landing.

Some basic procedures frequently employed for successfully navigating in this IFR environment are intercepting VOR radials and NDB bearings, entering holding patterns at VOR and NDB stations and at VOR intersections, intercepting NDB approaches, and performing procedure turns. To faciliate the performance of these basic procedures, an instrument pilot requires certain information. Heretofore, this information has been obtained after undertaking complex and time-consuming coordination and calculation of data provided by various flight charts, aircraft navigational instruments, and navigational computers, both hand-held and electronic.

In accordance with FAA flight regulations, pilots must demonstrate an instrument flight proficiency on a periodic basis. This demonstration involves making an instrument flight accompanied by a FAA certified examiner. Many pilots do not fly IFR on a regular basis. Thus, instrument flight instruction must be provided not only to student pilots who are working to become qualified for instrument flight but also to licensed pilots who need to refresh and maintain their IFR flying skills. Without regular practice, proficiency tends to rapidly diminish in the capability of many pilots to perform the necessary steps in coordination and calculation of data to obtain the information required to perform the basic IFR flight procedures.

Consequently, a need exists for a navigational tool which will greatly reduce the complications and length of time it has taken pilots in coordinating data and making calculations to obtain the information needed to perform basic IFR flight procedures.

SUMMARY OF THE INVENTION

The present invention provides an instrument flight navigational apparatus and method designed to satisfy the aforementioned needs. The instrument flight navigational apparatus and method of the present invention reduces the complexities and the amount of time involved in obtaining the information needed to perform basic IFR flight procedures, while maintaining the required precision of the information, so as to make both instruction and operation in the IFR environment less burdensome and more effective and enjoyable.

In accordance with the present invention, the instrument flight navigational apparatus comprises: (a) first means for defining a first center point and a display of a first indicia arranged relative to the first center point; (b) second means for defining a second center point and a display of a second indicia arranged relative to the second center point; (c) third means for defining a third center point and a display of a third indicia arranged relative to the third center point; (d) fourth means for defining a fourth center point and a display of a pointer arranged relative to the fourth center point; (e) the first, second and third indicia and the pointer being data and symbols adapted for use in solving navigational problems encountered in an instrument flight environment; and (f) fifth means for positioning the first, second, third, and fourth means such that the first, second, third, and fourth center points are aligned with one another and the displays of the first, second and third indicia and the display of the pointer are overlaid on one another and for permitting relative rotational movement of the overlaid displays relative to one another for solving navigational problems encountered in an instrument flight environment.

More particularly, the first means is a flat information board having a center hole. The first indicia on the board includes a plurality of markings defining a 360° compass about and spaced radially outwardly from the center hole, four 90° quadrants containing prompts at 30° and 45° angles, an automatic direction finder dial arranged about the center hole, a direction-of-flight line intersecting the center hole and extending to the markings at 0° and 180° of the compass and having arrowheads at opposite ends of the line pointing in the same direction, and 180°, 110° and 70° entry arcs for direct, parallel and teardrop types of entries to standard and non-standard holding patterns.

The second means is a generally circular holding pattern template of transparent material having a center hole. The second indicia includes a plurality of markings defining 0°, 90°, 180° and 270° points about and spaced radially outwardly from the center hole, a direction-of-flight line which intersects the center hole and extends to the markings at 0° and 180° thereof and has an arrowhead at one end of the line for pointing in an inbound direction, and a pair of standard and non-standard holding patterns disposed along opposite sides of the direction-of-flight line.

The third means is a compass protractor of transparent material having a center hole. The third indicia display includes a 360° scale encircling and spaced radially outwardly from the center hole. The scale is defined in 5° and 10° increments and in North, South, East and West cardinal headings.

The fourth means is an elongated flat indicator needle of transparent material having a center hole and the display of the pointer imprinted on the front face of the needle.

The fifth, or positioning, means includes a plurality of annular spacers disposed between the board, template, protractor and needle for spacing the template from the board, the protractor from the template, and the needle from the protractor so as to allow rotation of the template, protractor and needle independent of one another and relative to one another and to the board. The fifth means also includes a releasable fastener extending through the holes of the board, template, protractor and needle such that the holes are aligned with one another and the displays of the first, second and third indicia and display of the pointer are overlaid on one another. The fastener is adjustable to a non-clamping condition for permitting relative rotational movement of the template, protractor and needle and thereby the overlaid displays relative to one another for solving navigational problems encountered in an instrument flight environment. The fastener is also adjustable to a clamping condition for locking the template, protractor and needle and thereby the overlaid displays at any desired rotational angular position relative to one another and to the board.

Also, in accordance with the present invention, the instrument flight navigational method comprises the steps of: (a) defining separate first, second, third and fourth displays of first, second and third indicia and a pointer, each of the separate displays being arranged relative to a center point, the first, second and third indicia and the pointer being data and symbols adapted for use in solving navigational problems encountered in an instrument flight environment; (b) overlaying the first, second, third and fourth displays on one another with the center points thereof aligned with one another; and (c) rotating and setting any one of the overlaid first, second, third and fourth displays of the first, second and third indicia and the pointer relative to one another for solving the navigational problems encountered in the instrument flight environment.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is an exploded view of an instrument flight navigational apparatus of the present invention.

FIG. 2 is an enlarged foreshortened longitudinal sectional view of the apparatus of FIG. 1 after being assembled.

DETAILED DESCRIPTION OF THE INVENTION

Instrument Flight Navigational Apparatus

Figure 3:
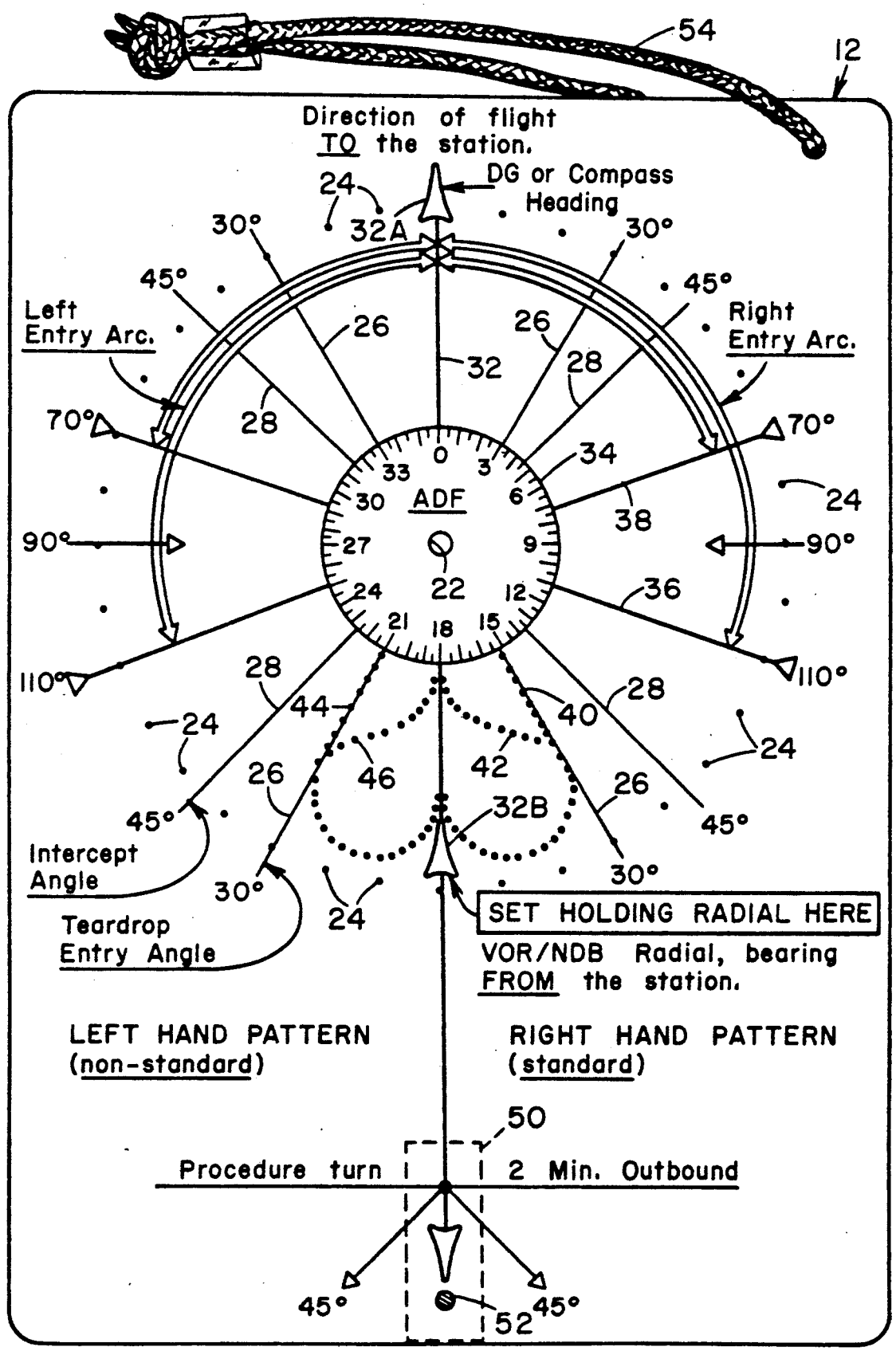
FIG. 3 is a plan view of a flat information board of the apparatus of FIG. 1.

Referring to FIGS. 1-4 of the drawings, there is illustrated an instrument flight navigational apparatus, generally designated 10, constructed in accordance with the principles of the present invention. Basically, the apparatus 10 includes first means in the form of a flat information board 12, second means in the form of a circular holding pattern template 14, third means in the form of a compass protractor 16, and fourth means in the form of an elongated indicator needle 18. The apparatus 10 also includes fifth means in the form of a releasably adjustable fastener and spacer assembly 20 for aligning and overlaying the board 12, template 14, compass protractor 16 and indicator needle 18 on top of one another so as to permit relative rotational movement of the overlaid components relative to one another and hold them at any desired angular position relative to one another for solving certain navigational problems faced by a pilot flying in an IFR environment, which will be described in detail later.

More particularly, referring to FIG. 3, the flat information board 12 has a pair of opposite front and rear faces and a center point in the form of a hole 22 formed therethrough at a generally centered location on the board 12 nearer to its top than bottom edge. In one example, the board 12 is made of ⅛ by six by eight inch plastic. The hole 22 is ⅛ inch in diameter and is centered and located three inches down from the top edge of the board 12.

As seen in FIG. 3, the board 12 has a display of a variety of indicia imprinted on the front face of the board 12. The indicia includes a plurality of markings 24 in the form of dots displaced 10° from one another about the center hole 22 so as to define a 360° compass scale encircling and spaced radially outwardly from the center hole 22. These marks will aid the pilot in determining angles to fly during some IFR procedures.

The indicia on the front face of the board 12 also includes four 90° quadrants in a 360° compass. The quadrants contain prompts or lines 26, 28 at 30° and 45° angles. The 30° prompts are used for teardrop procedures at holding patterns. The 45° prompts are used for determining intercept angles to headings and to establish outbound and inbound headings during procedure turns. Also, at the right and left of the board 12 are 90° prompts which are used for determining the start of timing legs for NDB holding patterns.

The indicia on the front face of the board 12 further includes a direction-of-flight line 32 intersecting the center hole 22 and extending to the markings 24 at 0° and 180° of the compass scale. The line 32 has arrowheads 32A, 32B at opposite ends of the line 32 which point in the same direction. The arrowhead 32A at the top of line 32 is used for setting aircraft direction of flight indications. The arrowhead 32B at the bottom of line 32 is used for setting the VOR radials and NDB headings FROM stations. Line 32 continues toward the bottom edge of the board 12 and provides information for procedure turns at stations.

The indicia on the front face of the board 12 further includes a small replica of a 360° automatic direction finder (ADF) face or dial 34 arranged about the center hole 22. This dial 34 represents the ADF found in the aircraft.

The right side of the board 12 is designed for use with right-hand operations, while the left side is designed for use with left-hand operations. All right-hand operations would be color-coded different from all left-hand operations, such as green for the former and red for the latter. Holding pattern entry arcs are shown on the board 12, the 0° to 70° arcs being for respective right and left teardrop entries and the 0° to 110° arcs for respective right and left parallel entries to the standard and non-standard holding patterns (which are the indicia on the template 14). Right and left direct entry arcs are the 180° areas located between the respective right and left solid lines 36, 38. Also, below the center hole 22 are dotted lines 40, 42 and 44, 46 which prompt the pilot of the ground tract during respective right and left teardrop and parallel entries to the standard and non-standard holding patterns.

Other indicia on the front face of the board 12 is printed information for entry angles, intercept angles, left and right-hand operations, direction of flight TO the station, and VOR/NDB radials and bearings FROM the station. Also, information in a rectangular box prompts the pilot to set the holding radial at the proper location at the bottom end of the compass.

The rear face (not shown) of the board 12 is fitted with a metal clip 50 (shown in dashed outline form) which can be used to hold approach plates is a ready position for the pilot to use. The clip 50 is secured with a small screw 52. A lanyard 54 is attached to a corner of the board 12 to use for locating the apparatus in a flight case or to use for hanging the apparatus from a hook in an aircraft cockpit. Finally, information can be printed on the back face of the board 12 for use by the pilot. As examples, such information can include Simplex Vhf Frequencies, Transponder Codes, Time Conversion Tables, IFR Above 18,000 Feet, Chart Visibility and Cloud Minimums, and Cruising Altitudes for VFR and IFR in controlled and un-controlled airspace.

Figure 4:
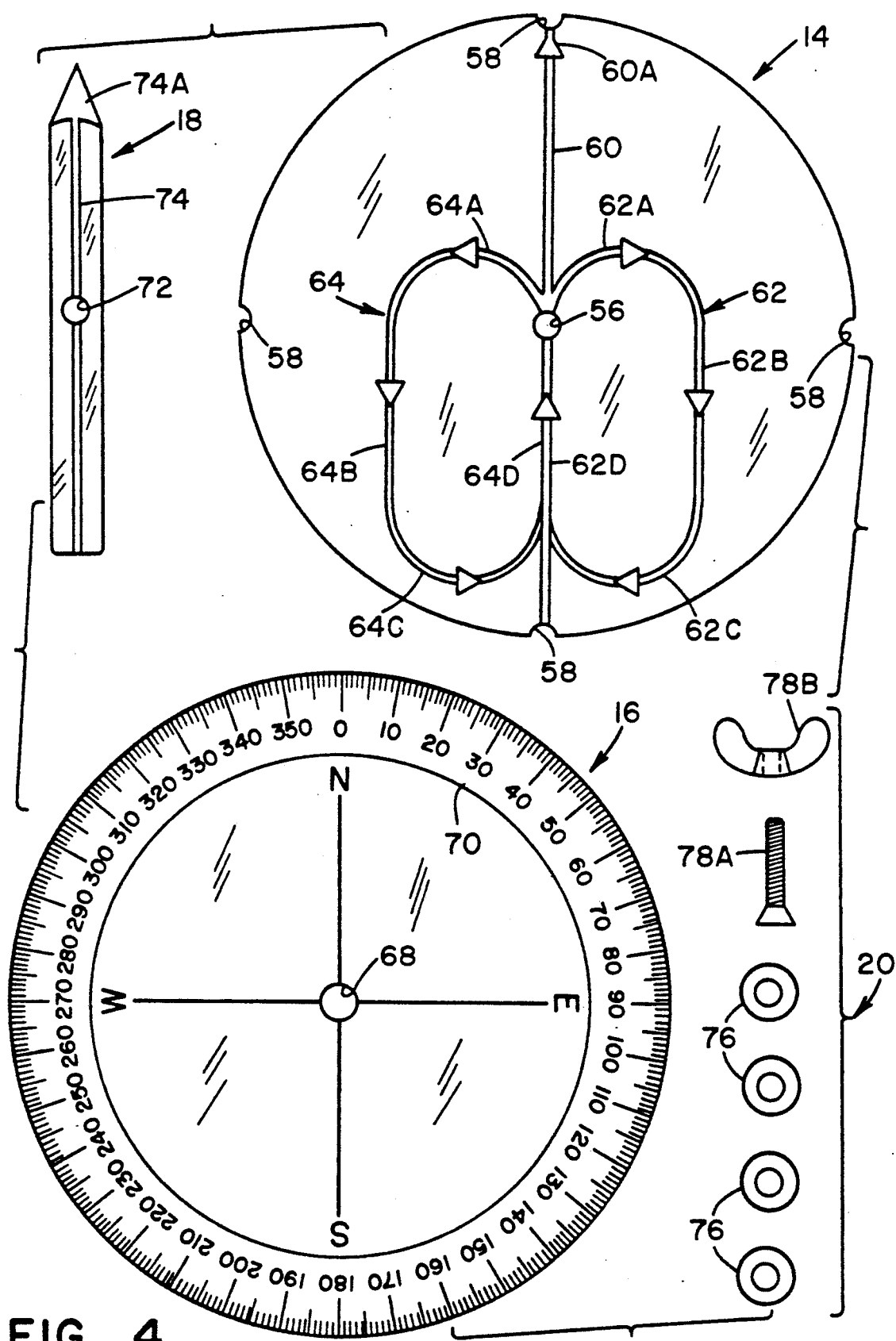
FIG. 4 is a plan view of the remaining components of the apparatus of FIG. 1, with the compass protractor being enlarged relative to the other components.

Referring to FIG. 4, the holding pattern template 14 of the apparatus 10 is preferably composed of a semi-rigid transparent sheet material. The template 14 has a pair of opposite front and rear faces and a center point in the form of a hole 56 formed through a center of the template. As an example, the template 16 can be made of 1/16 inch clear plastic and is four inches in diameter. The center hole 56 is ⅛ inch in diameter. The template 14 is placed in overlying relation to the information board 12.

The template 14 has a display of indicia imprinted on the front face of the template. The indicia includes a plurality of markings which, as examples, can be in the form of four semi-circular recesses 58 cut in the template 14 at 0°, 90°, 180° and 270° points about the peripheral edge thereof and spaced radially outwardly from the center hole 56 of the template 14. Also, a direction-of-flight arrow or line 60 is printed on the template 14 so as to intersect the center hole 56 and extends to the markings at 0° and 180° points thereof. The arrowhead 60A at the top end of the line 60 points in the direction of flight of the aircraft or an inbound direction.

Further, the display of indicia on the front face of the template 14 includes a pair of racetrack diagrams 62, 64 along opposite right and left sides of the direction-of-flight line 60 which represent the standard and non-standard holding patterns. With respect to the holding patterns 62, 64, the holding fix is located at a center point or hole 56 of the template 14. The fix end leg, outbound leg, outbound end leg and inbound leg of the respective holding patterns 62, 64 are identified by suffixes A, B, C and D added to the respective reference numerals. Also, the right-hand holding pattern would be colored green, while the left-hand holding pattern would be colored red. The arrows on the holding patterns depict the directions of flight to be used during these operations.

Referring still to FIG. 4, the compass protractor 16 of the apparatus 10 is preferably composed of a semi-rigid transparent material. The protractor 16 has a pair of opposite front and rear faces and a center point in the form of a hole 68 formed through the center of the protractor. As an example, the protractor 16 can be ⅛ inch clear plastic, 3½ inch in diameter. Its center hole 68 has an ⅛ inch diameter As seen in FIG. 2, the protractor 16 is placed in overlying relation to the template 14.

The protractor 16 has a display of indicia imprinted on the front face of the protractor. This indicia includes a 360° scale 70 encircling and spaced radially outwardly from the center hole 68 of the protractor 16. The scale 70 is defined in 1° increment marks and also has separate 5° and 10° increment marks. All numbers at 10° points are printed on the front face of the protractor 16. Also, the four cardinal headings of North, South, East and West are provided adjacent to the scale.

Referring again to FIG. 4, the elongated flat indicator needle 18 of the apparatus 10 is composed of semi-rigid transparent material. The needle 18 has a pair of opposite front and rear faces and a center point in the form of a hole 72 formed through a middle portion of the needle. The display on the needle 18 is an elongated pointer 74 imprinted on the front face of the needle. Preferably, the pointer 74 will be orange in color and has an arrowhead 74A at one end. As an example, the needle 18 is made of ⅛ inch clear plastic and is 3½ inches long. The center hole 72 has an ⅛ inch diameter. The indicator needle 18 is placed in overlying relation to the protractor 16.

Finally, referring to FIGS. 2 and 4, the fastener and spacer assembly 20 of the apparatus 10 includes a plurality of annular spacers 76 and a fastener 78 which, in turn, includes a threaded screw 78A and a wing nut 78B. The spacers 76 are disposed between the board 12, template 14, protractor 16 and needle 18 for spacing the template 14 from the board 12, the protractor 16 from the template 14 and the needle 18 from the protractor 16. The spacers 76 and the spacings they provide facilitate rotation of the template 14, protractor 16 and needle 18 independent of one another and relative to one another and to the board 12. As an example, the fastener screw 78A can be 8/32 by ½ inch. The spacers 76 can be nylon washers having ¾ inch diameters.

The fastener screw 78A extends through the respective center holes 22, 56, 68, 72 of the board 12, template 14, protractor 16 and needle 18 from the rear face of the board 12 so that the fastener wing nut 78B is threaded onto the fastener screw 78A above the front face of the board 12. The fastener 78 aligns the holes 22, 26, 68, 72 of the board 12, template 14, protractor 16 and needle 18 with one another so that the displays of indicia on the board 12, template 14 and protractor 16 and the display of the pointer 74 on the needle 18 are overlaid on one another in the desired manner.

The wing nut 78B is threadably adjustable on the screw 78A by the user between non-clamping (or loosened) and clamping (or tightened) conditions relative to the stacked board 12, template 14, protractor 16 and needle 18. In the non-clamping condition, the fastener 78 permits relative rotational movement by the user of any selected one or more of the overlaid template 14, protractor 16 and needle 18 and thereby their displays relative to one another and to the board 12 for solving the navigational problems encountered in the IFR environment. In the clamping condition, the fastener 78 permits the user to lock and maintain the template 14, protractor 16 and needle 18 at any desired rotational angular positions relative to one another and to the board 12.

The steps involved in using the above-described apparatus 10 to solve the navigational problems faced by an instrument pilot about to perform some basic IFR flight procedures will now be described in detail.

Determining Correct Holding Pattern Entry

To determine the correct holding pattern entry at VOR and NDB stations, the following sequence of steps are performed using the apparatus 10:

First: With the fastener 78 loosened, rotate the holding pattern template 14 in order to overlay and set the standard (color-coded green) holding pattern on the template 14 at the lower right side of the direction-of-flight line 32 on the board 12.

Second: While holding the template 14 stationary relative to the board 12, rotate the compass protractor 16 in order to overlay and set the holding radial from the station identified on the 360° scale 70 of the protractor at the FROM arrowhead 32B of the line 32 on the board 12.

Third: While holding both the template 14 and compass protractor 16 stationary relative to the board 12, rotate the needle 18 in order to overlay and set the arrowhead 74A of its pointer 74 at a position relative to the compass markings 24 on the board 12 which corresponds with the compass heading being observed on the aircraft's heading indicator (also known as the directional gyro).

Once the needle 18 reaches the desired position, the fastener 78 is tightened in order to lock and retain the template 14, protractor 16 and needle 18 at their respective set positions relative to one another and to to the board 12. To determine what holding pattern entry to use to enter either the standard or non-standard holding pattern, observe where the tail end of the needle 18 is located. The tail end of the needle 18 is located in the correct entry arc to be used, either the 180° arc for direct entry, the 110° arc for parallel entry, or the 70° arc for teardrop entry. Recall that a color such as green can be used to better identify the arcs for right-hand operations and a color such as red can be used to better identify the arcs for left-hand operations.

Once the user has determined which type of entry is the correct one to use, the correct one of the dotted ground tracks 40, 42, 44, 46 can be selected and provides prompts to follow to complete entry into the appropriate one of the holding patterns 62, 64. For NDB stations, a 90° radially-inwardly pointing arrow has been illustrated on the board 12 to provide an abeam prompt for each of the holding patterns 62, 64 as a reminder to start timing at this point in the procedure.

Determining Intercept Angle To VOR Radial Or NDB Heading

To determine the interception angle to a VOR radial or NDB heading, the following sequence of steps are performed using the apparatus 10:

First: With the fastener 78 loosened, identify on the 360° scale 70 of the compass protractor 16 the VOR radial or NDB heading that is to be intercepted and then rotate the protractor in order to overlay and set the identified VOR radial or NDB heading on the FROM arrowhead 32B at the tail of the direction-of-flight line 32 on the board 12.

Second: While holding the compass protractor 16 stationary relative to the board 12, read the indication on the 360° scale 70 of the protractor 16 overlaid by the TO arrowhead 32A at the head of the direction-of-flight line 32 on the board 12. This indication is the new heading for the aircraft to assume.

Third: After turning the aircraft to the new heading, the pilot selects the desired angle of intercept from the 30°, 45°, 70°, and 90° prompts and 10° interval markings on the board 12 and while still holding the protractor 16 stationary relative to the board 12, rotates the needle 18 to overlay the arrowhead 74A of its pointer 74 at the selected intercept angle marking on the board. Once the needle 18 has been rotated to the selected intercept angle marking, the fastener 78 is tightened in order to lock and retain the protractor 16 and needle 18 at their respective set positions relative to one another and to the board 12. The pointer arrowhead 74A now identifies on the 360° scale 70 of the protractor 16 the new heading for the aircraft to use for interception of the VOR radial or NDB bearing.

For intercepting a VOR radial, the pilot now sets the OBS of the aircraft VOR receiver to the heading shown on the protractor 16 at the TO arrowhead 32B of the line 32 on the board 12. The TO-FROM indicator of the aircraft VOR receiver should display a TO indication. When the CDI needle of the aircraft VOR receiver begins to center, the pilot turns the aircraft to the heading identified on the 360° scale 70 of the protractor at the TO arrowhead 32A of the line 32 on the board 12. At this time, the interception has been made and the aircraft is proceeding inbound along the VOR radial.

For intercepting a NDB bearing, the needle 18 must be rotated to the same selected intercept degree angle on the opposite side of the direction-of-flight line 32 on the board 12. For example, if an angle of intercept of 45° to the left was selected, the arrowhead 74A of the needle pointer 74 must be placed at the 45° angle to the right of the line 32. (It will be recalled that all VOR radials are FROM the station, while all NDB bearings are TO the station.) Now referring to the replica of the ADF dial 30 on the board 12, the point where the needle 18 crosses dial 30 provides an indication that should also appear on the aircraft ADF instrument dial when the aircraft is intercepting the selected NDB bearing. When the indication appears and the aircraft intercepts the selected NDB bearing, then turn the aircraft to the heading identified on the 360° scale 70 of the protractor at the TO arrowhead 32A of the line 32 on the board 12. The aircraft is now located on the bearing shown at the FROM arrowhead 32B, the intercept has been made and the aircraft is traveling inbound along the NDB bearing.

In both of the above cases, the VOR radial and NDB bearing interceptions were made without the need to use mathematical formulas to arrive at the solutions.

Obtaining Information For Making Procedure Turn

To obtain the information needed for making a 60-second procedure turn, the following sequence of steps are performed using the apparatus 10:

First: With the fastener 78 loosened, identify on the 360° scale 70 of the compass protractor 16 the outbound VOR radial or NDB heading from which the turn is to be made and then rotate the protractor in order to overlay and set the identified VOR radial or NDB heading on the FROM arrowhead 32B at the tail of the direction-of-flight line 32 on the board 12. Tighten the fastener 78 to lock and retain the setting of the protractor 16 relative to the board 12.

Second: After establishing the aircraft outbound on the VOR radial or NDB heading, fly for two minutes to reach the first 45° turn of the 60-second procedure turn. Prior to reaching this point, observe the lower half of the 360° scale 70 of the protractor 16 and identify the direction to fly on this leg which will be shown at the 45° intercept angle prompt. Fly the aircraft this direction for one minute.

Third: At the end of one minute, a standard rate turn is made for another minute after which the aircraft will be headed inbound on the reciprocal of the first heading. The reciprocal heading is shown at the 45° prompt in the upper half of the 360° scale 70 of the protractor 16. Fly this leg for 45 seconds or until the CDI needle begins to center if this is a VOR operation. At this point, turn to the inbound heading. If this is a NDB operation, the indicator will show a 45° intercept angle with either a 45° or 315° relative bearing depending upon whether it is a left or right-hand procedure turn. At this point, turn the aircraft to the inbound heading.

Fourth: Once the interception is complete, proceed inbound on the heading shown on the 360° scale 70 of the protractor 16 at the TO arrowhead 32A of the direction-of-flight line 32 on the board 12. The procedure turn has now been completed.

Determining Holding Pattern At VOR Intersections

To determine the holding patterns at VOR intersections, the following sequence of steps are performed using the apparatus 10:

First: With the fastener 78 loosened, identify on the 360° scale 70 of the compass protractor 16 the first of the two intersecting VOR radials that is the inbound radial to the aircraft destination and then rotate the protractor in order to overlay and set the identified VOR radial on the FROM arrowhead 32B at the tail of the direction-of-flight line 32 on the board 12.

Second: While holding the compass protractor 16 stationary relative to the board 12, rotate the needle 18 to place the arrowhead 74A of its pointer 74 pointing toward the second of the two intersecting VOR radials which is from a VOR station not the destination of the aircraft. The tail of the needle pointer 74 will be set on the second radial from the non-destination VOR station that forms the intersection.

Third: ATC will inform the aircraft which radial to hold on and will also tell the aircraft if it is to be a left-hand holding pattern. All holding patterns are right-hand unless told otherwise. The radial given to the aircraft is to be used for the inbound, or timed, leg of the holding pattern. ATC will also give the aircraft a cardinal heading from the intersection, which will be the direction where the holding pattern is to be executed. At this time, while holding the protractor 16 and needle 18 stationary relative to the board 12, the holding pattern template 14 is rotated so that the inbound leg lines overlays and is set to line up with the holding radial and so that the entire holding pattern is located at the cardinal direction requested by ATC. The inbound leg of the holding pattern will also be located on the cardinal heading. Entry angles for this operation are determined in the same manner as described earlier.

Determining NDB Approach With Vector To Intercept

To determine the NDB approach with vector to intercept, the following sequence of steps are performed using the apparatus 10:

First: When being vectored for a NDB approach the pilot should determine the heading used on the final approach to or from the facility being used for guidance. This information can be found on the published approach plate for this facility. With the fastener 78 loosened, the needle 18 is rotated to set its pointer arrowhead 74A at a location on the board markings 24 identifying the heading to be flown inbound on final approach.

Second: While holding the needle 18 stationary relative to the board 12, the compass protractor 16 is rotated to set the heading the aircraft identified on the 360° scale 70 of the protractor 16 at the TO arrowhead 32A of the direction-of-flight line 32.

Third: As new headings are given by ATC, set them at the TO arrowhead 32A by moving the needle 18 in unison with the protractor 16.

Fourth: When ATC tells the aircraft to continue the present heading until intercepting the inbound course, observe the board ADF dial 34 to tell what indication should be received on the aircraft ADF instrument dial. The needle 18 points to the relative bearing that will put the aircraft on course for the final approach.

Fifth: Turn the aircraft inbound to the heading which is located under the arrowhead 74A of the needle pointer 74 and complete the approach.

Determining Airport Traffic Patterns

To determine the airport traffic patterns, the following sequence of steps are performed using the apparatus 10:

First With the fastener 78 loosened, identify on the 360° scale 70 of the compass protractor 16 the runway headings and then rotate the protractor in order to overlay and set the identified headings respectively on the TO and FROM arrowheads 32A, 32B at the head and tail of the direction-of-flight line 32 on the board 12.

Second: Runway markings are marked to show the direction of flight that the aircraft is flying while inbound to the approach end of the runway, so the scale 70 appears to be backwards for this operation.

Third: The direction of the runway on which the aircraft intends to land should be located at the arrowhead 32A at the head of the direction-of-flight line 32.

Fourth: The pilot can now determine 45° inbound headings, downwind, base leg, and crosswind headings for both right and left hand traffic patterns.

From the foregoing description, it can be readily realized that the instrument flight navigational apparatus 10 provides a useful aid for student pilots, instructors, and instrument rated and non-instrument rated pilots. The apparatus 10 provides information for determining intercept angles to VOR and NDB navigation radio stations, and heading information to help determine entries into holding patterns both inbound and outbound. Also, the apparatus 10 provides information about VOR intersection hold patterns, information to determine ADF indications for intercept angles from VOR radials. ADF indications can be easily converted to headings without complex mental calculations. Prompts alert the pilot to the 90° point in NDB hold patterns for outbound timing and timing outbound for procedure turns.

Also, it should be realized that the displays of the various overlaid components of the apparatus 10 and the selected relative rotations thereof can be implemented by electronic computer on a video terminal instead of by the manual components described above. This is considered within the purview of the present invention. The displays could be defined, overlaid and rotatably manipulated relative to one another to solve the instrument flight problems by employing software similar to that utilized in computer aided design (CAD) wherein images are constructed of layered or overlaid slices which can be rotated relative to one another.

Optional fastening devices, such as eyelets or ferrules, can be used. Also, the one washer between the protractor 16 and needle 18 can be omitted to make it easier for the needle 18 to move in unison with the protractor 16 for certain operations.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. An instrument flight navigational apparatus, comprising:
    (a) first means for defining a first center point and a display of a first indicia arranged relative to said first center point;
    (b) second means for defining a second center point and a display of a second indicia arranged relative to said second center point;
    (c) third means for defining a third center point and a display of a third indicia arranged relative to said third center point;
    (d) fourth means for defining a fourth center point and a display of a pointer arranged relative to said fourth center point;
    (e) said first, second and third indicia and said pointer being data and symbols adapted for use in solving navigational problems encountered in an instrument flight environment, said first indicia including a plurality of markings defining a 360° compass about said first center point, a first direction-of-flight line extending through said first center point to said markings at 0° and 180° of said compass, an ADF (automatic direction finder) dial about said first center point between said compass and said first center point, and entry arcs about said first center point adjacent to said compass for direct, parallel and teardrop types of entries to standard and non-standard holding patterns, said second indicia including a second direction-of-flight line extending through said second center point and a pair of standard and non-standard holding patterns disposed along opposite sides of said direction-of-flight line, said third indicia including a 360° scale extending about said third center point; and (f) fifth means for positioning said first, second third and fourth means such that said first, second, third and fourth center points are aligned with one another and said displays of said first, second and third indicia and said display of said pointer are overlaid on one another for permitting relative rotational movement of said overlaid displays relative to one another for solving at least the following navigational problems encountered in an instrument flight environment: (i) determining holding pattern entry procedures at VOR (very high frequency omni-directional radio range) and NDB (non-directional beacon) stations; (ii) determining intercept angle to VOR radial or NDB heading; (iii) obtaining information for making procedure turn; (iv) determining holding pattern at intersection of VOR radials; and (v) determining NDB approach with vector to intercept.

2. The apparatus of claim 1 wherein said first means is a flat board having a pair of opposite front and rear faces, said first center point being a hold formed through a central location of an upper portion of said board, said display of said first indicia being imprinted on said front face of said board.

3. The apparatus of claim 2 wherein said first direction-of-flight line has arrowheads at opposite ends of said line pointing in the same direction.

4. The apparatus of claim 1 wherein said first indicia also includes four 90° quadrants containing prompts at 30° and 45° angles.

5. The apparatus of claim 1 wherein said second means is a generally circular holding pattern template of transparent material having a pair of opposite front and rear faces, said second center point being a hole formed through a center of said template, said display of said second indicia being imprinted on said front face of said template.

6. The apparatus of claim 5 wherein said second indicia further includes a plurality of markings defining 0°, 90°, 180° and 270° points about said center hole of said template.

7. The apparatus of claim 6 wherein said second second direction-of-flight line extends through said center point of said template to said markings at 0° and 180° thereof and has an arrowhead at one end of said line for pointing in an inbound direction.

8. The apparatus of claim 1 wherein said third means is a compass protractor of transparent material having a pair of opposite front and rear faces, said third center point being a hole formed through a center of said protractor, said display of said third indicia being imprinted on said front face of said protractor.

9. The apparatus of claim 8 wherein said 360° scale of said third indicia encircles and is spaced radially outwardly from said center hole of said protractor.

10. The apparatus of claim 9 wherein said scale is defined in 5° and 10° increments and in North, South, East and West cardinal headings.

11. The apparatus of claim 1 wherein said fourth means is an elongated flat indicator needle of transparent material having a pair of opposite front and rear faces, said fourth center point being a hole formed through a middle portion of said needle, said display of said pointer being imprinted on said front face of said needle.

12. The apparatus of claim 1 wherein:
said first, second, third and fourth center points are holes through said first, second, third and fourth means; and said fifth means is a fastener being operable for releasably and rotatably clamping said first, second, third and fourth means to one another at any desired angular position relative to one another.

13. An instrument flight navigational apparatus, comprising:
(a) a flat board having a pair of opposite front and rear faces, a hole formed through a central location of an upper portion of said board, and a first indicia displayed on said front face and arranged relative to said central hole of said board;

(b) a generally circular holding pattern template of semi-rigid transparent material having a pair of opposite front and rear faces, a hole formed through a center of said template, and a second indicia displayed on said front face and arranged relative to said center hole of said template;

(c) a compass protractor of semi-rigid transparent material having a pair of opposite front and rear faces, a hole formed through a center of said protractor, and a third indicia displayed on said front face and arranged relative to said center hole of said protractor;

(d) a flat elongated needle of semi-rigid transparent material having a pair of opposite front and rear faces, a hole formed through a middle portion of said needle pointer, and a pointer displayed on said front face and arranged relative to said hole of said needle;

(e) said first, second and third indicia and said pointer being data and symbols adapted for use in solving navigational problems encountered in an instrument flight environment, said first indicia including a plurality of markings defining a 360° compass about said center hole of said board, a first direction-of-flight line extending from said central hole to said markings at 0° and 180° of said compass, an ADF (automatic direction finder) dial about said central hole between said compass and said central hole, and entry arcs about said central hole adjacent to said compass for direct, parallel and teardrop types of entries to standard and non-standard holding patterns, said second indicia including a second direction-of-flight line extending through said center hole of said template and a pair of standard and non-standard holding patterns disposed along opposite sides of said second direction-of-flight line, said third indicia including a 360° scale extending about said center hole of said protractor; and (f) means for positioning said board, template, protractor and needle such that said holes thereof are aligned with one another and said displays of said first, second and third indicia and said display of said pointer are overlaid on one another and for permitting relative rotational movement of said overlaid displays relative to one another for solving at least the following navigational problems encountered in an instrument flight environment: (i) determining holding pattern entry procedures at VOR (very high frequency omni-directional radio range) and NDB (non-directional beacon) stations; (ii) determining intercept angle to VOR radial or NDB heading; (iii) obtaining information for making procedure turn; (iv) determining holding pattern at intersection of VOR radials; and (v) determining NDB approach with vector to intercept.

14. The apparatus of claim 13 wherein said positioning means includes a plurality of annular spacers disposed between said board, template, protractor and needle for spacing said template from said board, said protractor from said template and said needle from said protractor so as to facilitate rotation of said template, protractor and needle independent of one another and relative to one another and to said board.

15. The apparatus of claim 14 wherein said positioning means also includes a fastener extending through said holes of said board, template, protractor and needle such that said holes are aligned with one another and said displays of said first, second and third indicia and display of said pointer are overlaid on one another, said fastener being adjustable to a non-clamping condition for permitting relative rotational movement of said overlaid board, template, protractor and needle and thereby said displays thereon relative to one another for solving navigational problems encountered in an instrument flight environment, said fastener also being adjustable to a clamping condition for locking and retaining said board, template, protractor and needle and thereby said displays thereon at any desired rotational angular position relative to one another.

16. An instrument flight navigational method, comprising the steps of:
  (a) defining separate first, second, third and fourth displays of first, second and third indicia and a pointer, each of said separate displays being arranged relative to a center point, said first, second and third indicia and said pointer being data and symbols adapted for use in solving navigational problems encountered in an instrument flight environment, said first indicia including a plurality of markings defining a 360° compass about said center point of said first display, a first direction-of-flight line extending through said center point of said first display to said markings at 0° and 180° of said compass, an ADF (automatic direction finder) dial about said center point of said first display between said compass and center point thereof, and entry arcs about said center hole adjacent to said compass for direct, parallel and teardrop types of entries to standard and non-standard holding patterns, said second indicia including a second direction-of-fligth line extending through said center point of said second display and a pair of standard and non-standard holding patterns disposed along opposite sides of said second direction-of-flight line, said third indicia including a 360° scale extending about said center point of said third display;
  (b) overlaying said first, second, third and fourth displays on one another with said center points thereof aligned with one another; and
  (c) selectively rotating and setting any one of said overlaid first, second, third and fourth displays of said first, second and third indicia and said pointer relative to one another for solving at least the following navigational problems encountered in an instrument flight environment: (i) determining holding pattern entry procedures at VOR (very high frequency omni-directional radio range) and NDB (non-directional beacon) station; (ii) determining intercept angle to VOR radial or NDB heading; (iii) obtaining information for making procedure turn; (iv) determining holding pattern at intersection of VOR radials; and (v) determining NDB approach with vector to intercept.

17. The method of claim 16 wherein said first direction-of-flight line has arrowheads at opposite ends of said line pointing in the same direction.

18. The method of claim 16 wherein said first indicia also includes four 90° quadrants containing prompts at 30° and 45° angles.

19. The method of claim 16 wherein said second indicia further includes a plurality of markings defining 0°, 90°, 180° and 270° points about said center point of said second display.

20. The method of claim 19 wherein said second direction-of-flight line extends through said center point of said second display to said markings at 0° and 180° thereof and has an arrowhead at one end of said line for pointing in an inbound direction.

21. The method of claim 16 wherein said 360° scale of said third indicia encircles and is spaced radially outwardly from said center point of said third display.

22. The method of claim 16 wherein said scale is defined in 5° and 10° increments and in the four cardinal headings of North, South, East and West.

* * * * *